(12) United States Patent
Kokhab (10) Patent No.: US 6,563,770 B1
(45) Date of Patent: May 13, 2003

(54) METHOD AND APPARATUS FOR THE DISTRIBUTION OF AUDIO DATA

(76) Inventor: Juliette Kokhab, 411 Promentory Dr., Newport Beach, CA (US) 92660

( * ) Notice: Subject to any disclaimer, the term of this patent is extended or adjusted under 35 U.S.C. 154(b) by 0 days.

(21) Appl. No.: 09/467,291

(22) Filed: Dec. 17, 1999

(51) Int. Cl.[7] ............................................. G11B 21/08
(52) U.S. Cl. ................... 369/30.08; 369/30.04
(58) Field of Search .................... 369/30.04, 30.08, 369/30.09, 30.07, 30.12, 275.3, 27.01, 30.05, 30.19; 386/125, 126, 55

(56) References Cited

U.S. PATENT DOCUMENTS

| | | | |
|---|---|---|---|
| 4,707,818 A | * 11/1987 | Suzuki et al. ............ 369/30.04 |
| 5,164,839 A | 11/1992 | Lang |
| 5,384,893 A | 1/1995 | Hutchins |
| 5,475,835 A | 12/1995 | Hickey |
| 5,617,407 A | * 4/1997 | Bareis ...................... 369/275.3 |
| 5,684,786 A | * 11/1997 | Schylander et al. ...... 369/275.3 |
| 5,732,216 A | * 3/1998 | Logan et al. ................ 709/203 |
| 5,740,549 A | 4/1998 | Reilly et al. |
| 5,751,806 A | 5/1998 | Ryan |
| 5,758,323 A | 5/1998 | Case |
| 5,790,937 A | 8/1998 | Gutle |
| 5,809,472 A | 9/1998 | Morrison |
| 5,815,671 A | 9/1998 | Morrison |
| 5,937,162 A | 8/1999 | Funk et al. |
| 5,956,629 A | 9/1999 | Morrison |
| 6,091,674 A | * 7/2000 | Tozaki et al. ............ 369/30.04 |
| 6,119,116 A | * 9/2000 | Rose ........................... 707/10 |
| 6,163,510 A | * 12/2000 | Lee et al. ................ 369/30.04 |
| 6,288,990 B1 | * 9/2001 | Fujiie et al. ............ 369/30.04 |
| 6,366,953 B2 | * 4/2002 | Inoue ......................... 709/219 |
| 6,388,958 B1 | * 5/2002 | Yankowski .............. 369/30.06 |

* cited by examiner

Primary Examiner—Tan Dinh
(74) Attorney, Agent, or Firm—Eric Karich (57) ABSTRACT

An audio data distribution apparatus includes a central computer that disseminates specially formatted audio data to a local computer for transfer to and use on an audio data player. The invention includes a method for distributing audio data including a data collection process, a data distribution process, and a data selection and playing process. In the data collection process, a plurality of text articles are converted into audio data and formatted for storage on a plurality of additional data storage tracks. From this data, an audio table of contents is generated which describes the information within the audio data, the audio table of contents being formatted for storage on a first data storage track. In the data distribution process, the audio data and the audio table of contents are then downloaded to a digital storage disk. The user then plays the digital storage disk in an audio data player to listen first to the audio table of contents and then to selected audio data.

9 Claims, 5 Drawing Sheets

Fig. 7

METHOD AND APPARATUS FOR THE DISTRIBUTION OF AUDIO DATA

BACKGROUND OF THE INVENTION

1. Field of the Invention

This invention relates generally to the distribution of news and information, and more particularly to a method of distributing news and information in audio form directly to the homes or businesses of a plurality of users.

2. Description of Related Art

Numerous systems have been developed to transmit digital information on FM sub-carriers. Schwob, U.S. Pat. No. 5,152,011, teaches a single sideband communication system with FM data capacity for transmission of analog voice signals. Various commercial systems have been developed to transmit data to a personal computer via an FM broadcast. Command Audio Corporation has also developed a system to deliver data directly to a special portable electronic device for review by a user. The Command Audio technology is embodied by several patents, including Ryan, U.S. Pat. No. 5,751,806 and Morrison, U.S. Pat. No. 5,956,629.

Various products and services have been developed to broadly distribute information via computer or cable networks in different formats, including multimedia. Funk, U.S. Pat. No. 5,937,162 describes a high volume e-mail "newspaper." Lang, U.S. Pat. No. 5,164,839 describes an improved VCR ("VCR-ET") that is capable of storing audio-video programs in digital format for editing, copying and storing on magnetic disk for distribution to other VCR-ET machines. Gutle, U.S. Pat. No. 5,790,937 discloses a method for distributing multimedia documents. Hickey, U.S. Pat. No. 5,475,835 discloses an audio-visual inventory and playback control system. Beard, U.S. Pat. No. 5,451,942 discloses a method for multiplexed encoding of digital audio information that allows higher data flow rate than allowed with traditional storage/transfer media.

The prior art also teaches the use of computers to synthesize human speech from text data. Hutchins, U.S. Pat. No. 5,384,893 describes a method and apparatus for speech synthesis from strings of words. Case, U.S. Pat. No. 5,758,323 describes a system for producing voice files from an automated concatenated voice system based on pre-recorded recordings of a voice talent.

The prior art teaches the use of computers to distribute customized data directly to consumers. However, the prior art does not teach the present method of distributing data in an audio format with an audio table of contents, the audio format and audio table of contents making the data readily accessible by a plurality of consumers even when the consumer is engaged in another activity such as driving a vehicle. The present invention fulfills these needs and provides further related advantages as described in the following summary.

SUMMARY OF THE INVENTION

The present invention teaches certain benefits in construction and use which give rise to the objectives described below.

The present invention provides an audio data distribution apparatus and method of use to distribute audio data to a plurality of users in a format that is easy to access even when the user is performing another task such as driving a vehicle. The audio data distribution apparatus preferably includes a central computer that disseminates specially formatted audio data to a local computer for transfer to and use on an audio data player. The method for the distribution of audio data includes a data collection process, a data distribution process, and a data selection and playing process. In the data collection process, a plurality of text articles are converted into audio data and formatted for storage on a plurality of additional data storage tracks. From this data, an audio table of contents is generated which describes the information within the audio data, the audio table of contents being formatted for storage on a first data storage track. In the data distribution process, the audio data and the audio table of contents are then downloaded to a digital storage disk. The audio table of contents is written onto the first data storage track of the digital storage disk and the audio data is written onto the plurality of additional data storage tracks. In the data selection and playing process, the user plays the digital storage disk in an audio data player to listen first to the audio table of contents and then to selected audio data.

A primary objective of the present invention is to provide an audio data distribution apparatus and method having advantages not taught by the prior art.

Another objective is to provide an audio data distribution apparatus and method that can disseminate audio data with an audio table of contents directly to large numbers of users in a form that can be easily distributed, browsed, selected, and enjoyed, preferably during a commute in a vehicle or by the visually impaired.

A further objective is to provide an audio data distribution apparatus and method to provide inexpensive custom distribution of information in audio format so the information can be used and enjoyed by everyone, including the blind and the illiterate.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

The above described drawing figures illustrate the invention, an audio data distribution apparatus 10 and method of use to distribute audio data 14 to a plurality of users 18 in a format that is easy to access even when the user 18 is performing another task such as driving a vehicle. The audio data distribution apparatus 10, described in more detail below, includes a central computer 20 that disseminates specially formatted audio data 14 to a local computer 40, preferably a plurality of local computers 40, for transfer to and use on an audio data player 58. The method for the distribution of audio data 14 includes a data collection process, a data distribution process, and a data selection and playing process. In the data collection process, a plurality of text articles 12 are converted into audio data 14 and formatted for storage on one of a plurality of additional data storage tracks 56. From the audio data 14, an audio table of contents 16 is generated which describes the information within the audio data 14, the audio table of contents 16 being formatted for storage on a first data storage track 54. In the data distribution process, the audio data 14 and the audio table of contents 16 are then downloaded to a local computer 40 for storage onto the first data storage track 54 and the audio data 14 is written onto the plurality of additional data storage tracks 56. In the data selection and playing process, the user 18 plays the audio table of contents 16 and then to selected audio data 14.

The Audio Data Distribution Apparatus

Figure 1:
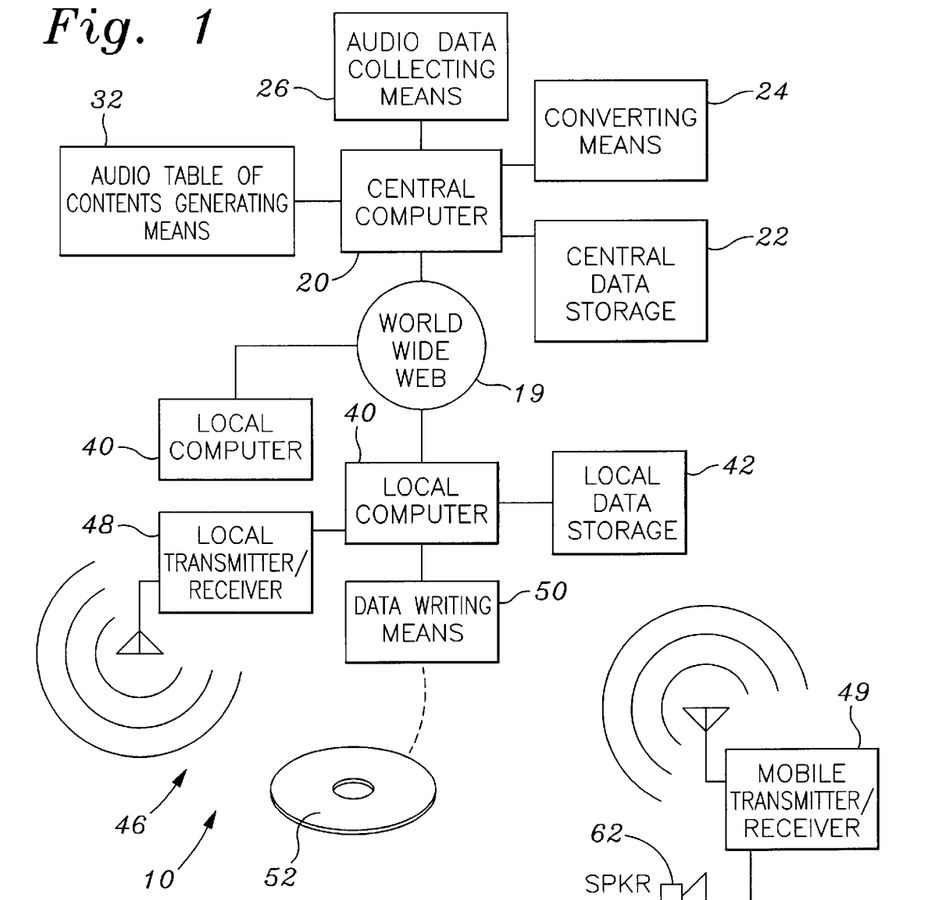
FIG. 1 is a block diagram of the data distribution system of the preferred embodiment of the present invention, the system showing the use of both a local transmitter/receiver and a digital storage disk.

As shown in FIG. 1, the audio data distribution apparatus 10 preferably includes a central computer 20 that disseminates the audio data 14 to the local computer 40, preferably via a global computer network such as the world wide web 19. The central computer 20 includes a central data storage 22, and preferably includes a means for converting 24 of text articles 12 into audio data 14 ("converting means 24") and a means for collecting 26 the audio data 14 ("audio data collecting means 26"). The central data storage 22 is preferably a magnetic storage drive, known as a hard drive, or an equivalent data storage mechanism as is well known in the art. Those skilled in the art can construct the central computer 20 without detailed instruction regarding processors, memory configurations, displays, keyboards, or other components known to those in the field.

Figure 5:
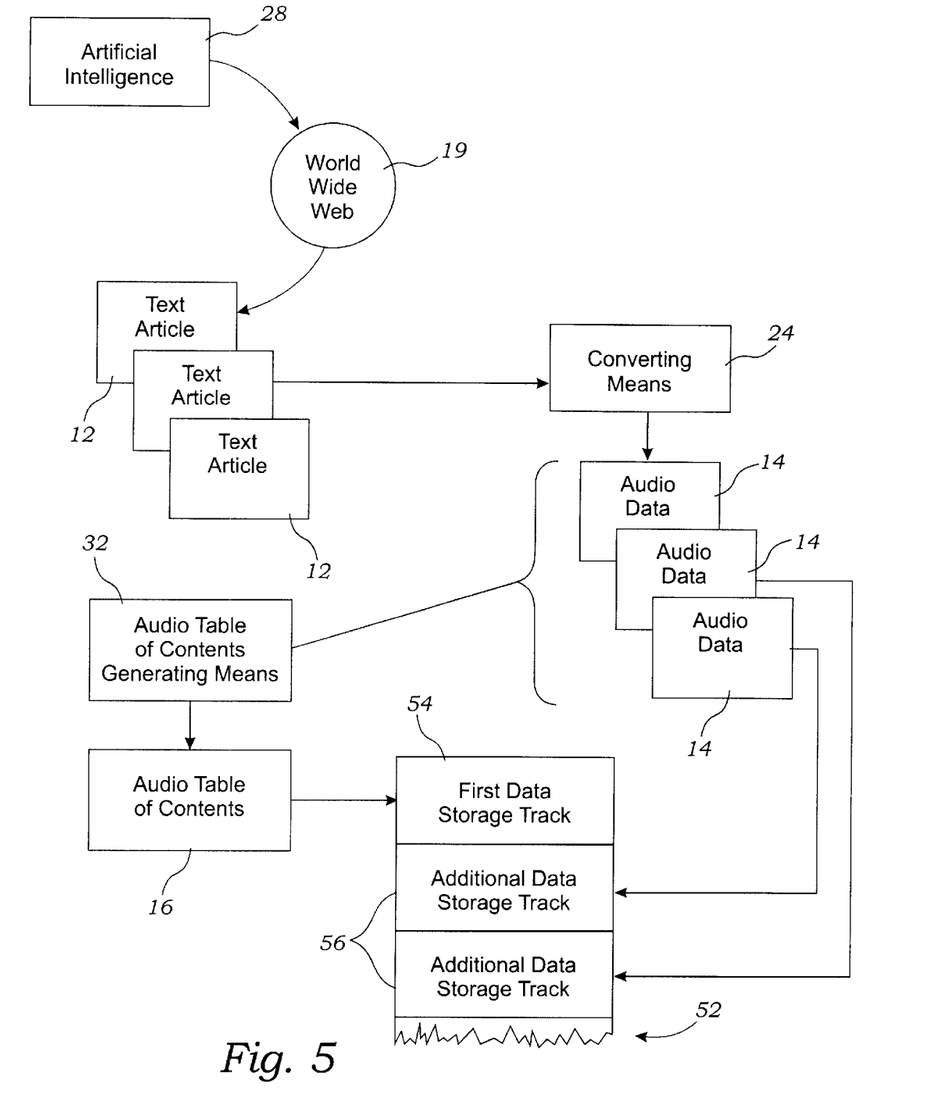
FIG. 5 is a block diagram of a data collection system used in the preferred embodiment of the present invention.
Figure 6:
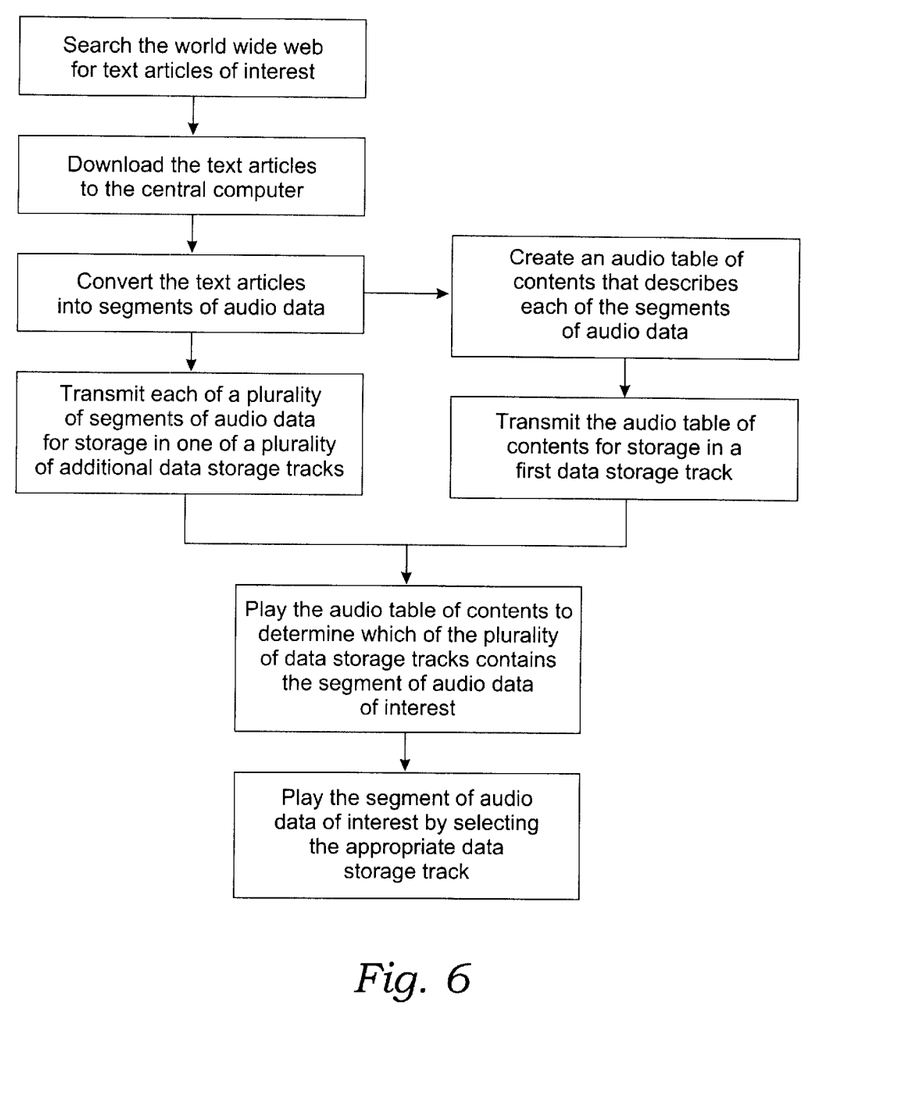
FIG. 6 is a flow diagram of the preferred method of using the present invention.
Figure 7:
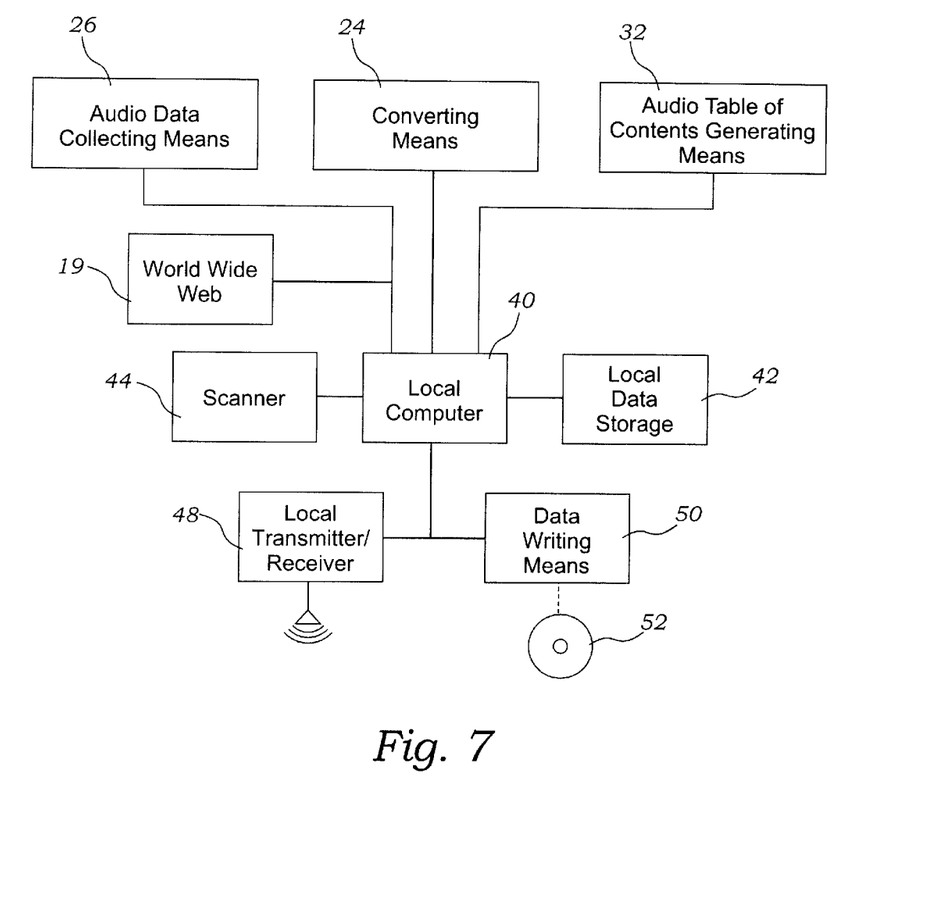
FIG. 7 is a block diagram of an alternative embodiment of the data distribution system wherein the local computer is operable connected to a scanner.

The converting means 24 is preferably a software program that converts text into sound such as speech. Such systems are known in the art. Examples of an acceptable systems are described in Hutchins, U.S. Pat. No. 5,384,893 and Case, U.S. Pat. No. 5,758,323, hereby incorporated by reference. The audio data collecting means 26 is the element that collects the text articles 12 for the users 18 to receive. As shown in FIG. 5, the audio data collecting means 26 is preferably an artificial intelligence 28 and a means for converting text-to-audio 30. The artificial intelligence 28 is a computer program capable of searching the world wide web 19 to find the plurality of text articles 12. Each of the plurality of text articles 12 are then delivered to the text-to-audio converting means 30 for conversion into the segments of audio data 14. In an alternative embodiment, the audio data 14 can be produced directly by hiring a professional speaker (not shown) to read selected text articles 12 and recording his or her voice. In a third embodiment, as shown in FIG. 7, the user 18 scans the text articles 12 into a scanner 44 operably attached to the local computer 40 for storage directly into the local data storage 42. Optical character recognition, well known in the art, is used to recognize the text from the scanned image.

Once the audio data 14 has been collected, a means for generating 32 an audio table of contents 16 ("audio table of contents generating means 32") is used to analyze either the plurality of text articles 12 or the audio data 14 to create the audio table of contents 16. The audio table of contents generating means 32 is preferably a software program, preferably resident on the central computer 20 but also possible resident on the local computer 40 or the audio data player. The software program of the audio table of contents generating means 32 scans each of the text articles 12 or the selected segments of audio data 14 and selects an appropriate description for the segment of audio data 14. This process can be as simple as converting the title of each of the text articles 12 into audio form using the automatic converting tools described above. In a low-tech alternative embodiment, a person (not shown) simply reads each of the text articles 12 and speaks into a microphone (not shown) to describe the segment of audio data 14. While using a person rather than a computer is not as automated, it is easy and relatively inexpensive. Once it is determined which of the additional data storage tracks 56 upon which the segment of audio data 14 will be stored, the number of the additional data storage track 56 is also referenced to the description of the segment of audio data 14. The user 18 is then able to listen to the audio table of contents 16 to determine which of the additional data storage tracks 56 contains the segment of audio data 14 that is of interest.

As shown in FIG. 1, once the audio data 14 and the audio table of contents 16 have been prepared, they are transmitted to a local computer 40. While we refer to the structure and function of a single local computer 40 for the purposes of clarity, it should be understood that this apparatus preferably utilizes a plurality of local computers 40, preferably hundreds of thousands of local computers 40. Each local computer 40 has a local data storage 42 and an appropriate processor, memory, and other components (not shown) known to those skilled in the art. Each of the local computers 40 is operably connectable to the central computer 20 for transmission of the audio data 14 from the central data storage 22 to the local data storage 42. This connection is well understood by those skilled in the art, and can include temporary Internet™ dial-up accounts through ISPs, permanent DSL or cable connections, and various satellite and wireless connections, as well as other methods know to the art. In the preferred embodiment, the local computer 40 is programmed to periodically connect (preferably at night) with the central computer 20 via the world wide web 19 and download the most current audio data 14. The local computer 40 then transmits the audio data 14 to the audio data player 58.

While the present invention describes the central computer 20 and the local computer 40 as different elements, those skilled in the art will recognize that it is possible to provide the functions of both elements in one physical machine. Especially as personal computers increase in processing power, it is anticipated that many of the functions of the central computer 20 will be transferred to the local computer 40, thereby providing the user 18 with even greater control over the content of the audio data 14. At present, however, it is preferred that the central computer 20 be a separate computer that can produce the audio data 14 in a central location and transmit the audio data 14 to all of the plurality of users 18.

Figure 2:
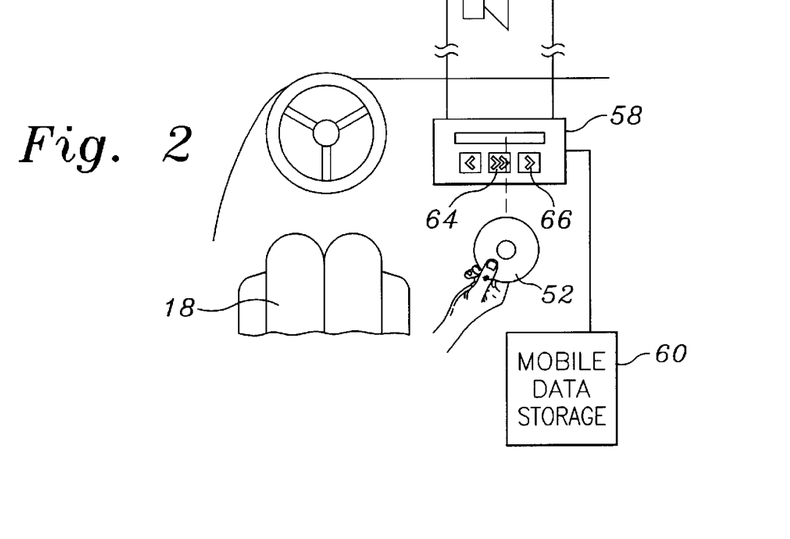
FIG. 2 is a block diagram of the data selection and playing system thereof, the system showing the use of both a mobile transmitter/receiver and an audio data player for the digital storage disk.

As shown in FIGS. 1 and 2, the audio data player 58 has a means for transferring 46 ("transferring means 46") the audio data 14 and the audio table of contents 16 from the local data storage 42 to a mobile data storage 60. The audio data player 58 further has a means for playing 62 the audio data 14 and the audio table of contents 16. In one embodiment, the transferring means 46 includes a local transmitter/receiver 48 operably attached to the local computer 40 and a mobile transmitter/receiver 49 operatively attached to the audio data player 58. As shown in FIG. 2, the mobile transmitter/receiver 49 is operably connectable with the local transmitter/receiver 48 for the transmission of the audio data 14 and the audio table of contents 16 from the local data storage 42 to the mobile data storage 60. The means for playing 62 is preferably at least one speaker. In one embodiment, the audio data player 58 is mounted in a vehicle such as an automobile so that the user 18 can listen to the audio data 14 while commuting to work. In another embodiment, the audio data player 58 is positioned so that a user 18 who is visually impaired can use the audio data player 58 to listen to the audio data 14.

In another embodiment, the transferring means 46 is a means for writing 50 ("data writing means 50") the audio data 14 and the audio table of contents 16 onto a digital storage disk 52 such as a CD-ROM or a DVD disk. The data writing means 50 is operably attached to the local computer 40. The data writing means 50 is preferably a CD-read/write peripheral computer device as is well known in the art. The audio table of contents 16 is stored on a first data storage track 54 and each of the segments of audio data 14 are stored on one of the additional data storage tracks 56, typically about thirteen tracks. The audio data player includes a means for playing 62 ("playing means 62") the audio table of contents 16 and the audio data 14. The playing means 62 is preferably at least one speaker.

The Method of Distributing Audio Data

The above-described apparatus enables a novel method for distributing audio data 14. As described above, this method includes a data collection process, a data distribution process, and a data selection and playing process. These three processes are described below in turn.

The Data Collection Process

As shown in FIG. 5, the method first uses a data collection process to collect the relevant data. The audio data collecting means 26 described above is used to gather text articles 12 of interest, either from existing publications or from the entire world wide web 19. Once the text articles 12 are collected, each of the text articles 12 are converted into segments of audio data 14 so that the user 18 can listen to the collected information in audio form. The converting means 24 described above is used to convert the text articles 12 into the segments of audio data 14 used to produce the final audio product to which the user 18 will listen. The converting means 24 is preferably a computer program that converts the text articles 12 into the segment of audio data 14 using a converting program known in the art. In an alternative low tech embodiment, the voice of a person reading articles of interest is recorded with a microphone or similar input device to produce the segment of audio data 14.

Once the audio data 14 is recorded in proper format, an audio table of contents 16 is generated. Descriptive titles of the various text articles 12 are recorded in audio format, in the order in which they will appear in the final product. This audio recording is produced in the same way as described above, either with a computer generating a description of each of the segments of audio data 14 or a person organizing the segments of audio data 14 and reading a description into a microphone. In the preferred embodiment, the audio data 14 includes not only data from a given publication, it also includes embedded advertisements (not shown) for products or services targeted to the user 18. Those skilled in the art know how to add advertisements to the stream of audio data so this aspect of the invention is not discussed in further detail.

While the preferred embodiment discussed above uses the central computer 20 for the data collection process, it is understood that the process can also be performed on one of the local computers 40 without altering the spirit of this invention. In one specific alternative embodiment, as shown in FIG. 7, the data collection is specifically performed by the local computer 40. In one such embodiment, the local computer 40 captures the text files with a scanner 44. In another embodiment, the local computer 40 includes the artificial intelligence 28 typically called a search "bot", as described above. If the artificial intelligence 28 is located in the local computer 40, the central computer 20 is obviously not required to downloading the audio data 14 from the central computer 20, as long as the local computer 40 also contains the above-described computer programs necessary to properly process the audio data 14 and generate the audio table of contents 16.

The Data Distribution Process

The next step in the method is the data distribution process. In the preferred embodiment, using the above described computer network, the audio data 14 is distributed from the central computer 20 to the local computer 40 of the user 18 via a global computer network such as the world wide web 19. It is well known in the art how to download the audio data 14 of interest from the central computer 20 to the local computer 40 of the user 18. As described above, the download process can be automated with software known in the art so that even a lengthy download can be done during the night so that the computer activities of the user 18 are not interrupted. This download can be made to potentially hundreds of thousands of users 18 from a single central location using many software technologies, including a mass email as described in Funk et al., U.S. Pat. No. 5,937,162, hereby incorporated by reference.

Once the audio data 14 is stored in the local data storage 42, it is necessary to transfer the audio data 14 from the local computer 40 to the audio data player. The two preferred methods of transferring the audio data 14 are described above. The audio data 14 can be stored on the digital storage disk 52, such as the CD-ROM 52, if the local computer 40 has a CD-read/write peripheral device 50. The CD-ROM 52 is then inserted into the audio data player 58, preferably a common CD-player which is already present in many desirable locations such as the vehicle of the user 18. This method has the advantage of being simple and inexpensive since many users 18 already own and are familiar with CD-ROMs 52, CD-players 58, and CD-read/write peripheral devices 50.

In an alternative embodiment, the audio data 14 is transmitted via the wireless connection described above from the local computer 40 to the audio data player. One advantage of this system is that the entire operation is automatic—the user 18 does not have to remember to bring the CD-ROM 52 to the vehicle to listen to its contents. This system does not require a powerful transmitter/receiver, such as an FM broadcast station, as other systems require. A low power transmitter can be used to transfer the audio data 14 the short distance from the local computer 40 to the audio data player 58.

The Data Selection and Playing Process

Figure 3:
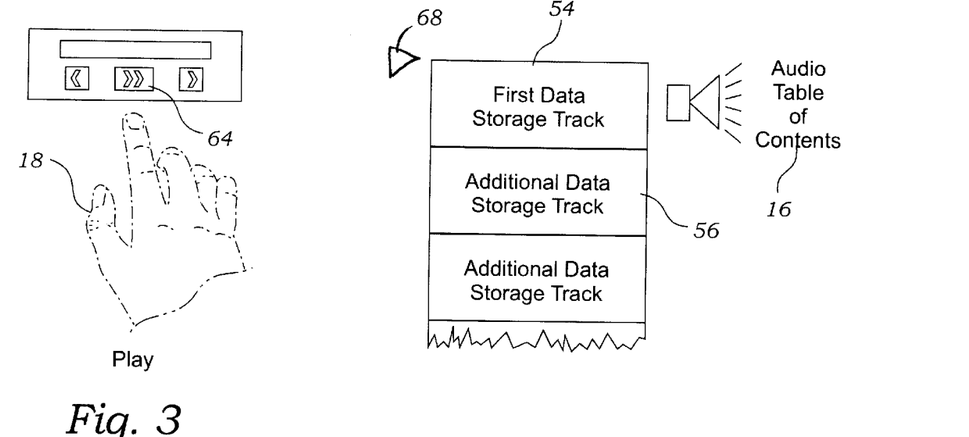
FIG. 3 is a block diagram of the data storage of a digital storage disk, the digital storage disk having a first data storage track and a plurality of additional data storage tracks, the audio data player being shown in an initial position in which it reads from the first data storage track to play an audio table of contents.
Figure 4:
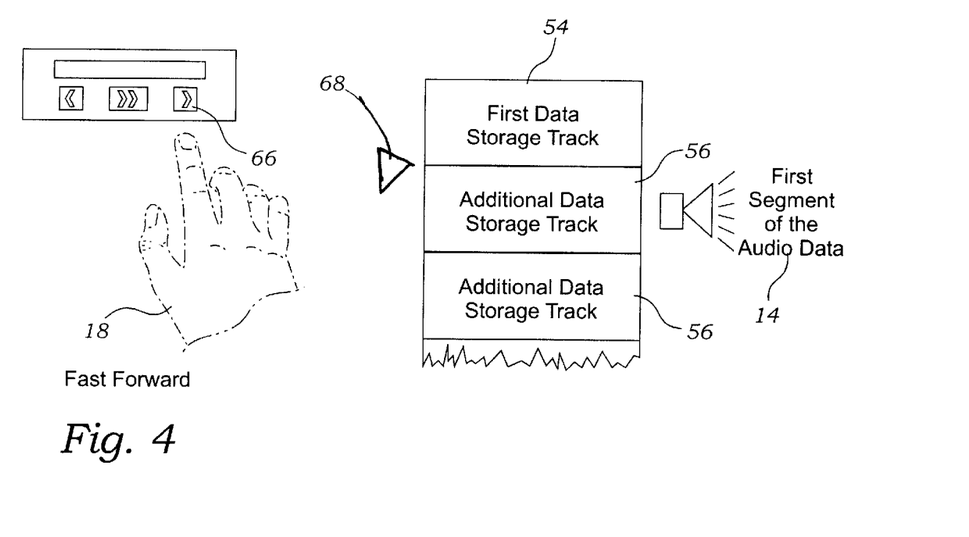
FIG. 4 is a block diagram thereof in which the audio data player has been advanced to a second position in which it reads from one of the additional data storage tracks.

Once the audio data 14 has been transferred to the audio data player 58, the user 18 can then select the segments of audio data 14 to which he or she would like to listen. Those skilled in the art are well familiar with CD-players 58 installed as part of a stereo system of a vehicle, so a detailed description is not included. It is sufficient to note that the CD-player 58 preferably includes a play button 64, a fast-forward button 66, a reader head 68, and at least one speaker 62, as shown in FIG. 2. The fast-forward button 66 allows the user 18 to select which additional data storage track 56 to which he or she would like to listen by moving the reader head 68 to the appropriate position over the CD-ROM 52. As shown in FIG. 3, the user 18 initially presses the play button 64, thereby causing the reader head 68 to scan the first data storage track 54 so that the user 18 can listen to the audio table of contents 16. The audio table of contents 16 informs the user 18 which of the additional data storage tracks 56 contain the segments of audio data 14 of interest. As shown in FIG. 4, the user 18 then presses the fast-forward button 66 until the reader head of the CD-player 58 is operably positioned to read the additional data storage track 56 that contains one of the segments of audio data 14 of interest. By then pressing the play button 64 again, the user 18 can then listen to the segment of audio data 14 that is of interest.

In the alternative embodiment, in which the audio data 14 is transmitted directly to the audio data player 58, the audio data player 58 contains a mobile data storage 60 that is preferably a magnetic storage disk drive known in the art. The mobile data storage 60 is partitioned into the first data storage track 54 and the additional data storage tracks 56 as is the CD-ROM 52 just described. The audio data player 58 is preferably designed to operate in the same manner as a CD-player 58 as described above, only without requiring the CD-ROM 52.

Method of Use

In practice, the preferred embodiment of this invention allows the user 18 to subscribe to receive audio data 14 via the above-described system. The audio data 14 is preferably an audio form of a newspaper or professional journal, however in alternative embodiments the audio data 14 can be almost any information, news, entertainment or educational materials. Every night the text articles 12 of the newspaper are read (or machine translated) into an audio data 14 format. An audio table of contents 16 of the text articles 12 is prepared to describe which text articles 12 are available and on which additional data storage track 56. During the night, the audio data 14 and the audio table of contents 16 are then downloaded to the local computer 40 of all subscribers. The audio data 14 and the audio table of contents 16 are then wither written onto the CD-ROM 52. In the morning, the user 18 takes the CD-ROM 52 out of the local computer 40 and inserts it into the CD-player 58, which can be used almost anywhere. The CD-player 58 is preferably installed in the vehicle of the user 18, thereby allowing the user 18 to listen to the morning paper while commuting to work. In an alternative embodiment, a portable CD-player 58 is used by a user 18 who is visually impaired.

In the preferred embodiment, the central computer 20 also contains a web page (not shown) that can be accessed by the various users 18. The web page can be devised by those skilled in the art so it is not discussed in detail; however, the web page preferably allows the user 18 to sign up for the program and also select what type of audio data 14 he or she would like to receive. For example, in the simplest configuration, the user 18 can select a given newspaper or professional journal and receive the audio data 14 created from that specific publication. In more complex configurations, the user 18 can select types of text articles 12 he or she would like to receive from a variety of publications and even the entire content of the world wide web 19. The central computer 20 simply creates a user profile based on the responses of the user 18 to specific questions and then delivers audio data 14 of interest to that user 18. In another complex embodiment, the user 18 can actually specify what he wants to receive in the particular. For example, a user 18 may want stock data about a specific company and any articles related to the company. The user 18 may also want to receive any articles about a specific political candidate or other specific person of interest. In the alternative embodiment in which the local computer 40 includes the scanner 44, the user 18 can include text articles 12 from any publication.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A method for distributing audio data, the method comprising the steps of:
   a) providing a digital storage disk having a first data storage track and a plurality of additional data storage tracks;
   b) recording a plurality of segments of audio data on the plurality of additional data storage tracks, each segment of audio data being stored on a different one of the additional data storage tracks;
   c) recording an audio table of contents on the first data storage track, the audio table of contents describing each of the segments of audio data, and describing which of the additional data storage track contains each of the segments of audio data;
   d) providing a audio data player for playing the contents of the digital storage disk;
   e) playing the audio table of contents to determine which of the segments of audio data are of interest and which of the plurality of additional data storage tracks contains the segments of audio data of interest; and
   f) selecting at least one of the plurality of additional data storage tracks and playing the segment of audio data of interest.

2. The method of claim 1 comprising the steps of:
   a) producing a plurality of segments of audio data;
   b) formatting the plurality of segments of audio data so that each segment of audio data is assigned to one of a plurality of additional data storage tracks;
   c) producing an audio table of contents describing each of the plurality of segments of audio data and to which of the plurality of additional data storage tracks that segment of audio data has been assigned;
   d) providing a local computer and a local data storage;
   e) transmitting the plurality of segments of audio data and the audio table of contents to the local computer for storage in the local data storage;
   f) providing a digital storage disk having a first data storage track and the plurality of additional data storage tracks;
   g) providing a means for writing the plurality of segments of audio data and the audio table of contents from the local computer onto the digital storage disk;
   h) writing the audio table of contents onto the first data storage track;
   i) writing each of the plurality of segments of audio data onto one of the plurality of additional data storage tracks;

j) providing an audio data player;

k) playing the audio table of contents on the audio data player to determine which of the plurality of additional data storage tracks contain the segments of audio data that are of interest; and l) selecting at least one of the plurality of additional data storage tracks and playing at least one of the plurality of segments of audio data.

3. The method of claim 2 wherein the step of producing a plurality of segments of audio data further comprises the steps of:

providing a means for collecting audio data including an artificial intelligence and a means for converting text-to-audio;

using the artificial intelligence to search a global computer network to find a plurality of text articles; and converting the plurality of text articles, using the text-to-audio converting means, into the audio data.

4. The method of claim 2 further comprising the steps of:

m) providing a central computer having a central data storage;

n) storing the plurality of segments of audio data and the audio table of contents on the central data storage; and o) periodically connecting the local computer to the central computer, transferring the plurality of segments of audio data and the audio table of contents from the central data storage to the local data storage, the storing the audio table of contents onto the first data storage track, and storing the plurality of segments of audio data onto the plurality of additional data storage tracks.

5. A method for distributing audio data, the method comprising the steps of:

a) producing a plurality of segments of audio data;

b) formatting the plurality of segments of audio data so that each segment of audio data is assigned to one of a plurality of additional data storage tracks;

c) producing an audio table of contents describing each of the plurality of segments of audio data and to which of the plurality of additional data storage tracks that segment of audio data has been assigned;

d) providing a local computer and a local data storage;

e) transmitting the plurality of segments of audio data and the audio table of contents to the local computer for storage in the local data storage;

f) providing an audio data player having a mobile data storage, the mobile data storage having a first data storage track and a plurality of additional data storage tracks;

g) transmitting the plurality of segments of audio data and the audio table of contents from the local computer onto the audio data player;

h) storing the audio table of contents onto the first data storage track;

i) storing each of the plurality of segments of audio data onto one of the plurality of additional data storage tracks;

j) providing a speaker for playing the audio data stored on the digital storage disk;

k) playing the audio table of contents to determine which of the plurality of additional data storage tracks contain audio data of interest; and l) selecting at least one of the plurality of additional data storage tracks and playing one of the plurality of segments of audio data.

6. The method of claim 5 wherein the step of producing a plurality of segments of audio data further comprises the steps of:

providing a means for collecting audio data including an artificial intelligence and a means for converting text-to-audio;

using the artificial intelligence to search a global computer network to find a plurality of text articles; and converting the plurality of text articles, using the text-to-audio converting means, into the audio data.

7. The method of claim 5 further comprising the steps of:

m) providing a central computer having a central data storage;

n) storing the plurality of segments of audio data and the audio table of contents on the central data storage; and o) periodically connecting the local computer to the central computer, transferring the plurality of segments of audio data and the audio table of contents from the central data storage to the local data storage.

8. The method of claim 1 wherein the audio data includes audio advertising data.

9. The method of claim 1 wherein a plurality of text articles are scanned into a local computer and translated into the plurality of segments of audio data.

* * * * *